United States Patent
Kamata et al.

Patent Number: 5,369,718
Date of Patent: Nov. 29, 1994

[54] TOTAL INTERNAL REFLECTION-TYPE OPTICAL WAVEGUIDE SWITCH

[75] Inventors: Yoshiyuki Kamata, Ichihara; Hisaharu Yanagawa, Tokyo, both of Japan

[73] Assignee: The Furukawa Electric Co., Ltd., Tokyo, Japan

[21] Appl. No.: 960,554

[22] Filed: Oct. 13, 1992

[30] Foreign Application Priority Data

Oct. 15, 1991 [JP] Japan ................. 3-265994

[51] Int. Cl.$^5$ ............................. G02B 6/26
[52] U.S. Cl. ........................... 385/21; 385/18
[58] Field of Search ............ 385/16, 17, 18, 20, 385/21, 8, 9

[56] References Cited

U.S. PATENT DOCUMENTS

| | | | |
|---|---|---|---|
| 4,746,183 | 5/1988 | Soref et al. | 385/18 |
| 4,753,505 | 6/1988 | Mikami et al. | 385/16 X |
| 4,775,207 | 10/1988 | Silberberg | 385/21 X |
| 4,795,225 | 1/1989 | Sakai et al. | 385/16 |
| 4,832,430 | 5/1989 | Tada et al. | 385/18 X |
| 5,033,811 | 7/1991 | Yanagawa et al. | 385/16 |

FOREIGN PATENT DOCUMENTS

| | | | |
|---|---|---|---|
| 0137851 | 4/1985 | European Pat. Off. | |
| 2-298923 | 12/1990 | Japan | 385/16 |
| 3-055525 | 3/1991 | Japan . | |
| 3-209226 | 9/1991 | Japan | 385/17 |

OTHER PUBLICATIONS

Applied Physics Letters, vol. 54, No. 2, Jan. 1989, "Carrier-Injection-Type Optical Switch in GaAs With A 1.06–1.55 μm Wavelength Range", F. Ito et al., pp. 134–136.
Patent Abstracts of Japan, vol. 8, No. 121, (P-2787) Jun. 7, 1984 & JP-A-59 028 132 (Tateishi) Feb. 14, 1984.
Patent Abstracts of Japan, vol. 12, No. 214 (P-718) Jun. 18, 1988 & JP-A-63 010 134 (OKI Electric) Jan. 16, 1988.
Patent Abstracts of Japan, vol. 15 No. 207 (P-1207) May 28, 1991 & JP-A-03 055 525 (Furukawa) Mar. 11, 1991.

*Primary Examiner*—John D. Lee
*Attorney, Agent, or Firm*—Frishauf, Holtz, Goodman & Woodward

[57] ABSTRACT

In a total internal reflection-type optical waveguide switch which comprises optical waveguides crossing each other so that a refractive index changing region for developing a reflective surface is formed at a crossing section between the waveguides, the refractive index changing region has a configuration such that the reflective surface constitutes a concave surface recessed with respect to one lateral portion of the crossing section. When the refractive index changing region is not activated, incident light upon the spot corresponding to the reflective surface is insensitive to changes of the refractive index in the refractive index changing region, so that the initial crosstalk level can be lowered.

30 Claims, 6 Drawing Sheets

F I G. 11
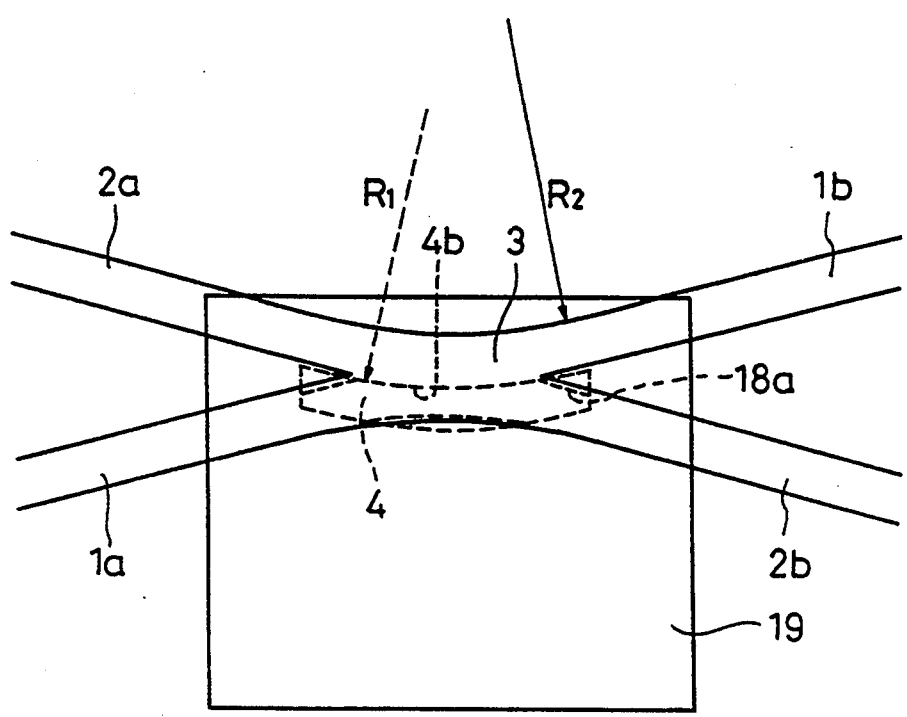

TOTAL INTERNAL REFLECTION-TYPE OPTICAL WAVEGUIDE SWITCH

BACKGROUND OF THE INVENTION

1. Field of the Invention

The present invention relates to a total internal reflection-type optical waveguide switch, and more particularly, to a total internal reflection-type optical waveguide switch lowered in the level of initial crosstalk at the time of switching operation.

2. Description of the Prior Art

In the field of optical communication, a total internal reflection-type optical switch is used for optical path switching. A semiconductor-type optical waveguide switch, as an example of this total internal reflection-type optical switch, will now be described with reference to the accompanying drawings.

FIG. 1 is a schematic plan view showing a conventional example of the total internal reflection-type optical waveguide switch. In FIG. 1, two optical waveguides 1 and 2 cross at an angle $\theta$, thus forming a crossing section 3. If light is incident as indicated by arrow p, optical waveguides 1a and 2a both function as incidence-side optical waveguides, while optical waveguides 1b and 2b both function as emission-side optical waveguides. A refractive index changing region 4 is formed at the crossing section 3 between the optical waveguides.

The portion of each optical waveguide other than the refractive index changing region 4 is constructed in the manner shown in the sectional view of FIG. 2, which is taken along line II—II of FIG. 1. If GaAs and AlGaAs are used as semiconductor materials, for example, a substrate 12 of GaAs is formed on the back of a lower electrode 11, and n+GaAs is built up to form a buffer layer 13 on the substrate 12.

A lower cladding layer 14 of n+AlGaAs and a core layer 15 of n−GaAs are successively formed on the buffer layer 13. Then, an upper cladding layer 16 of n−AlGaAs and a cap layer 17 of n−GaAs are successively formed on the core layer 15, and are etched to form a ridge-shaped optical waveguide. The whole resulting structure is covered by an insulating film 18 of SiO$_2$ or the like.

As shown in the sectional view of FIG. 3, which is taken along line III—III of FIG. 1, on the other hand, a diffused region 4a is formed in the refractive index changing region 4 by diffusing a predetermined amount of an impurity, such as Zn, into the upper cladding layer 16 so that the impurity nearly reaches the core layer 15. A slit-shaped insulating film aperture 18a is formed by partially removing the insulating film 18, which covers the surface of the crossing section 3, for a predetermined width with respect to the longitudinal direction of the crossing section 3. Then, an upper electrode 19 is mounted on the insulating film aperture 18a.

In the case of this optical waveguide switch, if light is applied to the incidence-side optical waveguide 2a, as indicated by arrow p in FIG. 1, without causing any operation between the upper and lower electrodes 19 and 11, the light directly advances straight through the crossing section 3, and emerges from the emission-side optical waveguide 2b, as indicated by arrow q.

If electric current of a predetermined value, for example, is injected from the upper electrode 19 via the insulating film aperture 18a, however, the refractive index of that portion of the core layer 15 which is situated under the refractive index changing region 4 is lowered. As a result, a boundary surface 4b between the refractive index changing region 4, whose refractive index is lowered, and the optical waveguides, whose refractive index is not lowered, develops at the crossing section 3. The boundary surface 4b is situated on a straight line which bisects the intersection angle $\theta$.

Accordingly, the incident light upon the incidence-side optical waveguide 2a changes its optical path toward the emission-side optical waveguide 1b, with the boundary surface 4b used as a reflective surface, as indicated by broken line q' in FIG. 1, and then emerges from the waveguide 1b. Thus, the boundary surface 4b of the refractive index changing region 4 is made to be a totally reflective surface by the current injection, and the light is totally reflected by this surface, so that a switching function develops.

In the case of the optical waveguide switch described above, however, the insulating film aperture has the form of a slit, so that the boundary surface 4b of the refractive index changing region 4, which is formed by diffusing Zn through the insulating film aperture, has a flat configuration.

At the crossing section 3, the refractive index changing region 4 contains different materials, so that the refractive index of the remaining portions of the optical waveguides is finely different from that of the region 4. Even when no electric current is injected from the electrode 19, therefore, the light incident upon the incidence-side optical waveguide 2a is reflected or refracted by the boundary surface 4b, resulting in an optical loss. Thus, the initial crosstalk level in the through state is high.

OBJECT AND SUMMARY OF THE INVENTION

The object of the present invention is to provide a total internal reflection-type optical waveguide switch capable of reducing the optical loss at the time of switching operation, thereby lowering the initial crosstalk level.

In order to achieve the above object, according to the present invention, there is provided a total internal reflection-type optical waveguide switch which comprises optical waveguides crossing each other so that a refractive index changing region for reflecting light is formed at a crossing section between the waveguides, the refractive index changing region having a concave reflective surface recessed with respect to one lateral portion of the crossing section.

At the crossing section of the total internal reflection-type optical waveguide switch according to the present invention, the boundary surface (reflective surface) based on a refractive index difference caused by the difference in material between the refractive index changing region and the remaining portions of the optical waveguides is concave.

When the refractive index changing region is not activated, therefore, light propagated from an incidence-side optical waveguide to the boundary surface is less sensitive to changes of the refractive index in the refractive index changing region than in the case where the boundary surface is flat, so that the initial crosstalk level can be lowered.

BRIEF DESCRIPTION OF THE DRAWINGS

FIG. 11 is a schematic plan view showing still another embodiment of the optical switch according to the invention.

DETAILED DESCRIPTION OF THE PREFERRED EMBODIMENTS

Figure 4:
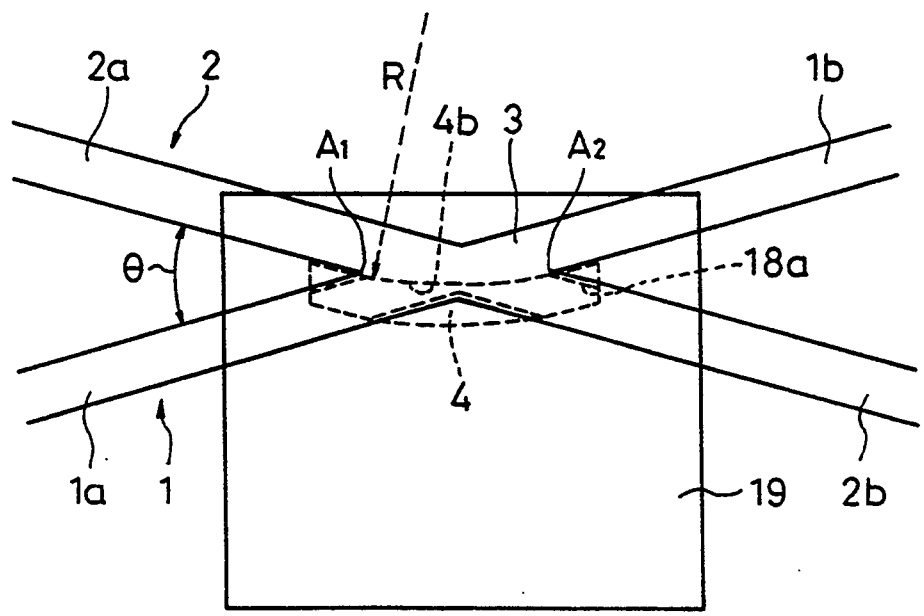
FIG. 4 is a schematic plan view showing an embodiment of an optical switch according to the present invention.

FIG. 4 is a plan view showing an example of a switch according to the present invention.

Figure 1:
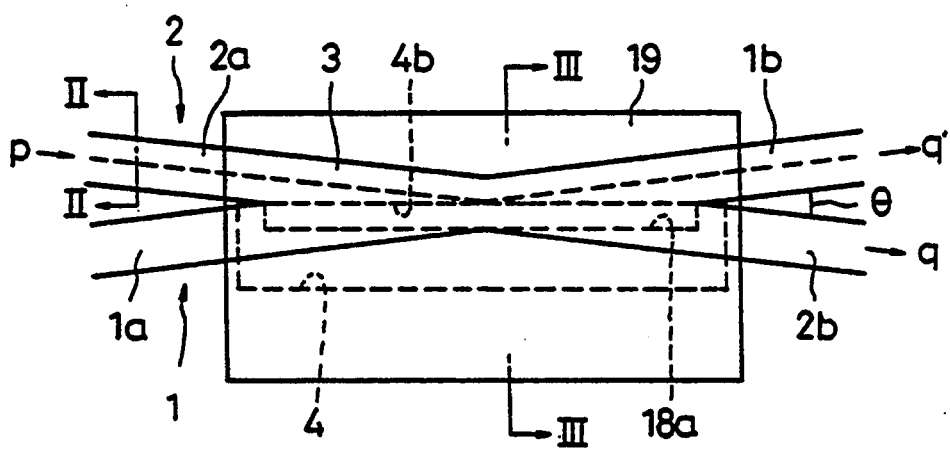
FIG. 1 is a schematic plan view showing a conventional total internal reflection-type optical waveguide switch.

The general construction of this switch differs from that of the total internal reflection-type optical waveguide switch of the conventional construction shown in FIG. 1 only in the configuration of the boundary surface between the refractive index changing region 4 and the remaining portions of the optical waveguides at the crossing section.

More specifically, the boundary surface of the refractive index changing region 4 is shaped so that the portion thereof extending from an intersection A1 between incidence-side optical waveguides 1a and 2a to an intersection A2 between emission-side optical waveguides 1b and 2b has a concave which is recessed with respect to that lateral portion of the crossing section 3 on the side of the incidence-side optical waveguide 2a (and emission-side optical waveguide 1b), is shown in FIG. 4.

In this case, the concave may, for example, be a curved surface defined by a circular arc having a fixed curvature radius R or a curved surface defined by a curve with a gradually varying curvature radius, such as the circumference of an ellipse.

The following is a definite description of an example of a method for manufacturing this optical switch.

Figure 2:
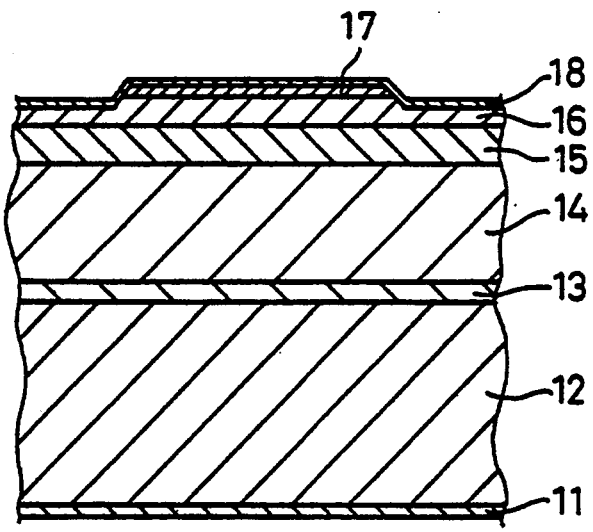
FIG. 2 is a sectional view taken along line II—II of FIG. 1.
Figure 3:
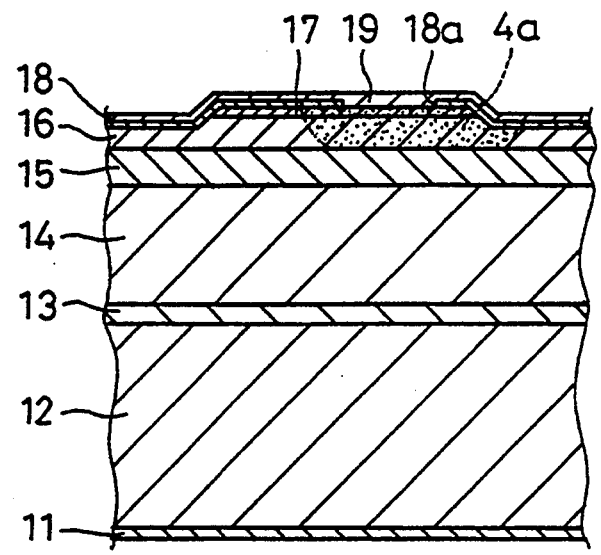
FIG. 3 is a sectional view taken along line III—III of FIG. 1.

As shown in FIGS. 2 and 3, for example, the buffer layer 13 of e.g. n+GaAs, lower cladding layer 14 of e.g. n+AlGaAs, core layer 15 of e.g. n−GaAs, upper cladding layer 16 of e.g. n−AlGaAs, and cap layer 17 of e.g. n−GaAs are successively built up on the substrate 12 of n+GaAs by the MOCVD process.

Then, the other portion of the surface except the insulating layer aperture 18a of FIG. 4 is covered with a masking material, and Zn is diffused through the aperture 18a to form the Zn-diffused region 4a which reaches the upper surface of the core layer 15. The configuration of the diffused region 4a includes the curved surface which is curved between the intersections A1 and A2 of FIG. 4 and defined by the circular arc having the curvature radius R.

Thereafter, the masking material is removed, the cap layer 17 and the upper cladding layer 16 are etched so that the light to be guided is in a single mode, and the incidence-side optical waveguides 1a and 2a, the emission-side optical waveguides 1b and 2b, and the crossing section 3 are formed each in the shape of a ridge so that the intersection angle is $\theta$.

Subsequently, the insulating film 18 of e.g. $SiO_2$ is formed on the whole surface of the resulting structure, the portion corresponding to the insulating film aperture 18a shown in FIG. 1 is removed by etching, and the upper electrode 19 of, e.g. Ti/Pt/Au, is mounted there. Finally, the lower surface of the GaAs substrate 12 is polished, and the lower electrode 11 of, e.g. AuGeNi/Au, is mounted thereon.

Although the semiconductors have been described as the materials of the switch, the present invention is not limited to this, and the switch may alternatively be formed of a dielectric material, such as $LiNbO_3$. If the material composition of the refractive index changing region is changed, moreover, switching operation can be performed by applying voltage from the upper electrode.

Embodiment 1

The buffer layer 13 of n+GaAs 0.5 μm in thickness, lower cladding layer 14 of n+$Al_{0.2}Ga_{0.8}As$ 3.0 μm in thickness, core layer 15 of n−GaAs 0.8 μm in thickness, upper cladding layer 16 of n−$Al_{0.2}Ga_{0.8}As$ 0.8 μm in thickness, and cap layer 17 of n−GaAs 0.2 82 m in thickness were successively built up on the n+GaAs substrate 12 by the MOCVD process. By doing this, an optical switch, such as the one shown in FIG. 4, was manufactured having the curvature radius R of 5 mm and the intersection angle $\theta$ of 4°.

Figure 5:
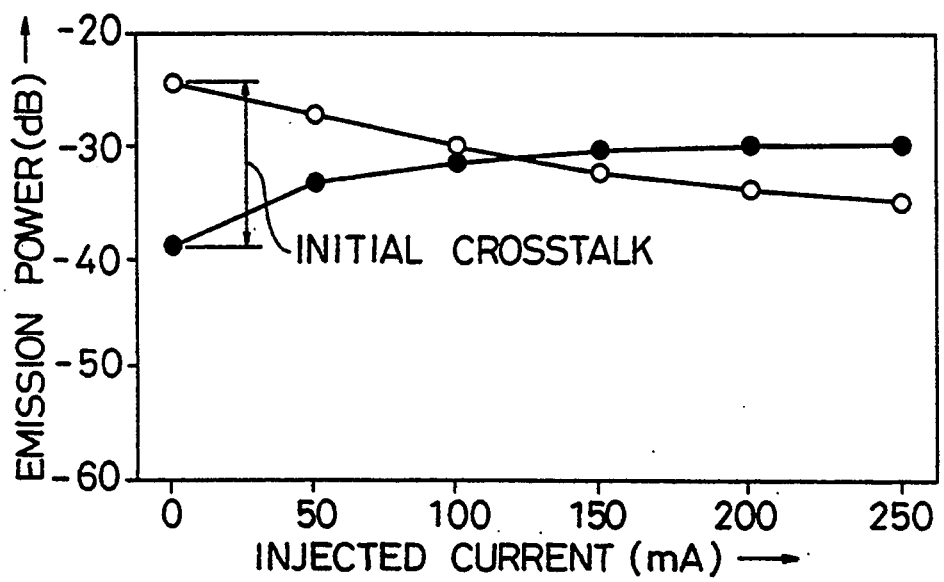
FIG. 5 is a graph showing the switching characteristics of the optical switch of FIG. 4.

FIG. 5 shows the switching characteristics of this optical waveguide switch for the light of 1.55 μm wavelength.

In FIG. 5, a circle represents the emission power from the emission-side optical waveguide 2b obtained when the light is applied from the incidence-side optical waveguide 2a, and a black spot represents the emission power from the emission-side optical waveguide 1b.

When no electric current is injected from the upper electrode 19, as seen from FIG. 5, the incident light advances straight through the crossing section 3, and propagates toward the emission-side optical waveguide 2b. As the injected current increases, the emission power from the emission-side optical waveguide 1b increases, thus enabling switching operation at about 200 mA.

As seen from FIG. 5, moreover, the initial crosstalk level of this optical switch is about 18.5 dB. As compared with about 9.2 dB for the initial crosstalk level of the optical switch with the construction of FIG. 1 in which the reflective surface of the refractive index changing region is flat, this value indicates that the optical loss of the resulting optical switch is very small.

Embodiment 2

An optical waveguide switch was manufactured in the same manner as Embodiment 1 except that the semiconductor compositions for the lower and upper cladding layers 14 and 16 were n+$Al_{0.1}Ga_{0.9}As$ and n−$Al_{0.}$- lGa$_{0.9}$As, respectively, core layer 15 of n⁻GaAs was 1.0 μm in thickness, and that the intersection angle θ was 5°.

Figure 6:
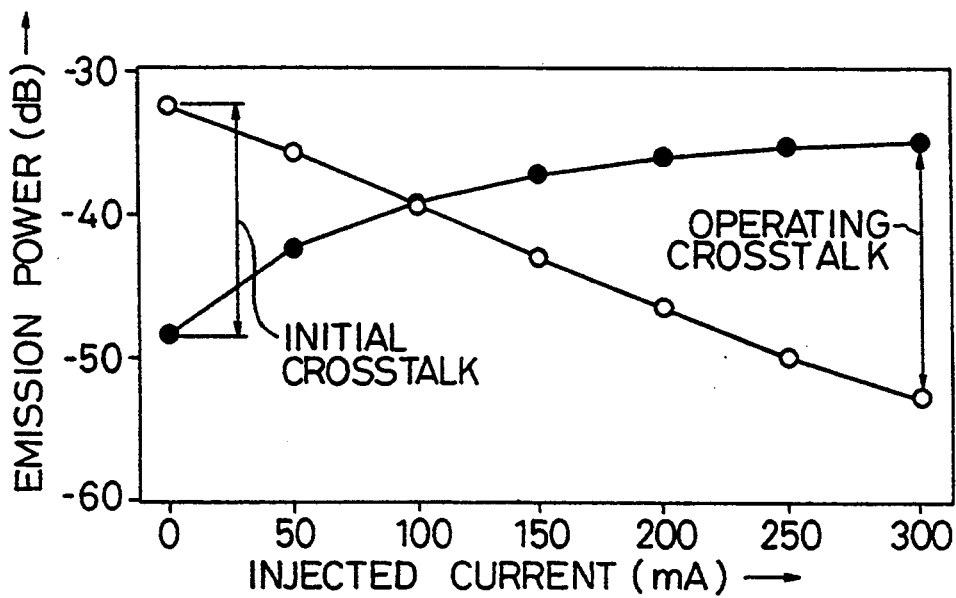
FIG. 6 is a graph showing the switching characteristics of a modification of the optical switch of FIG. 4.

FIG. 6 shows the switching characteristics of this optical waveguide switch for the light of 1.55 μm wavelength.

In FIG. 6, a circle represents the emission power from the emission-side optical waveguide 2b obtained when the light is applied from the incidence-side optical waveguide 2a, and a black spot represents the emission power from the emission-side optical waveguide 1b.

As seen from FIG. 6, this optical switch starts the switching operation at about 100 mA, and its initial crosstalk level is 16.0 dB.

Further, the operating crosstalk level of this optical switch is 17.8 dB. Thus, both the initial and operating crosstalk characteristics are highly improved.

In the case of an optical switch with the intersection angle θ at 5° and its refractive index changing region shaped as shown in FIG. 1, its initial and operating crosstalk levels were 12.4 dB and 18.0 dB, respectively.

Embodiment 3

An optical waveguide switch was manufactured in the same manner as Embodiment 2 except that the intersection angle θ was 6°.

Figure 7:
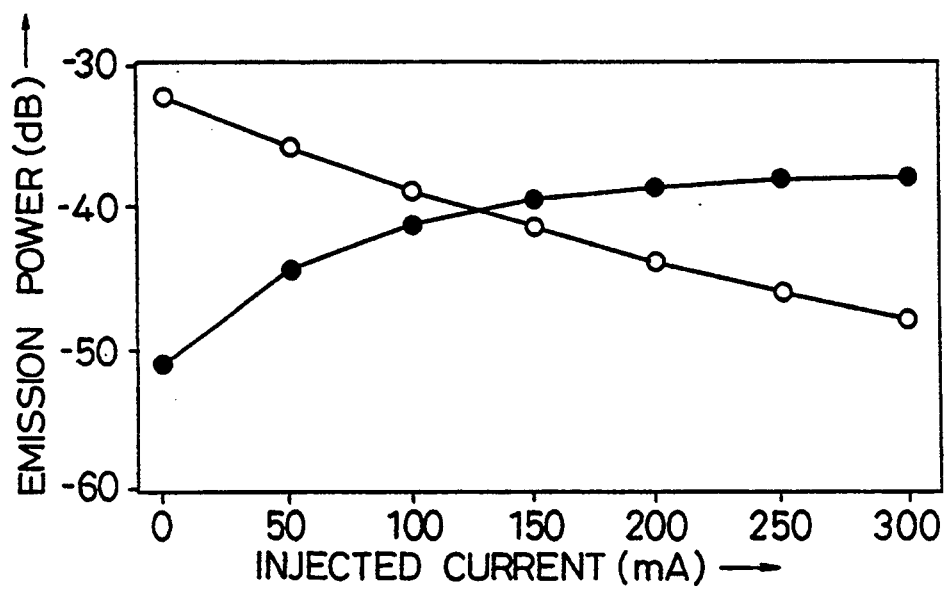
FIG. 7 is a graph showing the switching characteristics of another modification of the optical switch.

FIG. 7 shows the switching characteristics of this optical waveguide switch for the light of 1.55 μm wavelength.

In FIG. 7, a circle represents the emission power from the emission-side optical waveguide 2b obtained when the light is applied from the incidence-side optical waveguide 2a, and a black spot represents the emission power from the emission-side optical waveguide 1b.

As seen from FIG. 7, this optical switch starts the switching operation at about 130 mA, and its initial crosstalk level is 18.7 dB.

Further, the operating crosstalk level of this optical switch is 9.9 dB.

In the case of an optical switch with the intersection angle θ at 6° and its refractive index changing region shaped as shown in FIG. 1, its initial and operating crosstalk levels were 17.6 dB and 9.6 dB, respectively.

Embodiment 4

Figure 8:
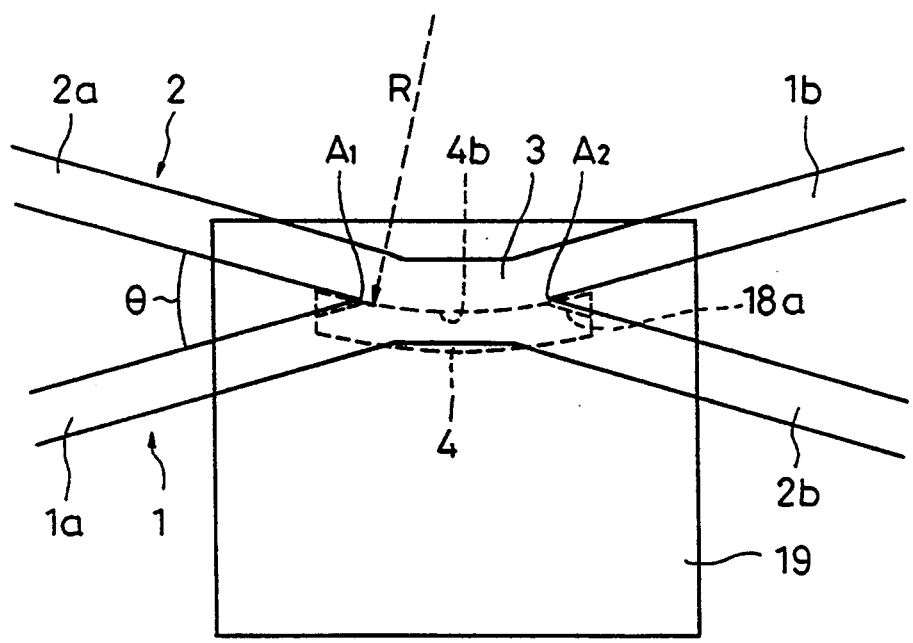
FIG. 8 is a schematic plan view showing another embodiment of the optical switch according to the invention.

An optical waveguide switch was manufactured in the same manner as Embodiment 2 except that the crossing section 3 has a wide plane configuration having parallel lateral portions, as shown in FIG. 8.

Figure 9:
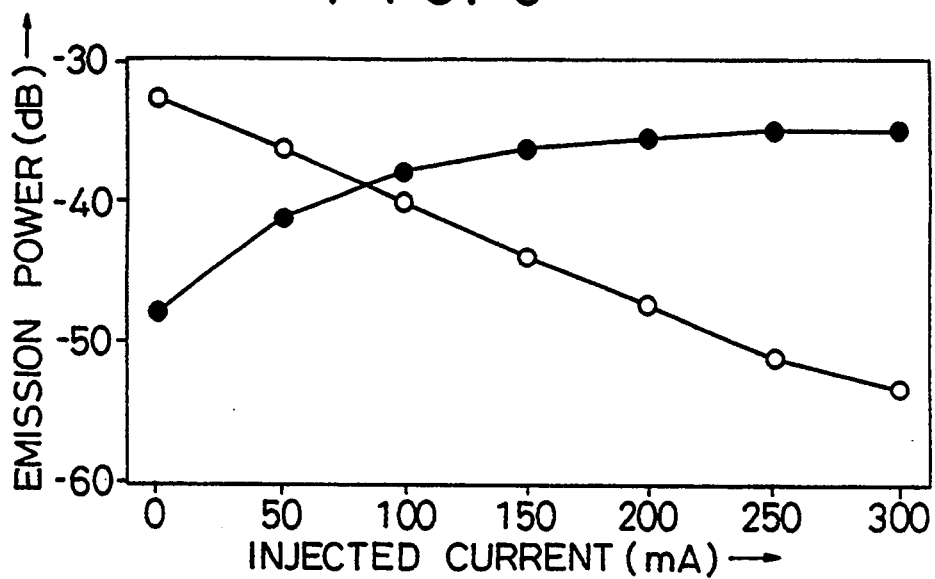
FIG. 9 is a graph showing the switching characteristics of the optical switch of FIG. 8.

FIG. 9 shows the switching characteristics of this optical waveguide switch for the light of 1.55 μm wavelength.

In FIG. 9, a circle represents the emission power from the emission-side optical waveguide 2b obtained when the light is applied from the incidence-side optical waveguide 2a, and a black spot represents the emission power from the emission-side optical waveguide 1b.

As seen from FIG. 9, this optical switch starts the switching operation at about 80 mA, and its initial crosstalk level is 15.5 dB.

Further, the operating crosstalk level of this optical switch is 18.5 dB. Thus, both the initial and operating crosstalk characteristics are highly improved.

In the case of an optical switch with the plane configuration of its crossing section 3 as wide as that of Embodiment 4, the intersection angle θ at 5°, and its refractive index changing region shaped as shown in FIG. 1, its initial and operating crosstalk levels were 13.2 dB and 15.3 dB, respectively.

Embodiment 5

An optical waveguide switch was manufactured in the same manner as Embodiment 4 except that the intersection angle θ was 6°.

Figure 10:
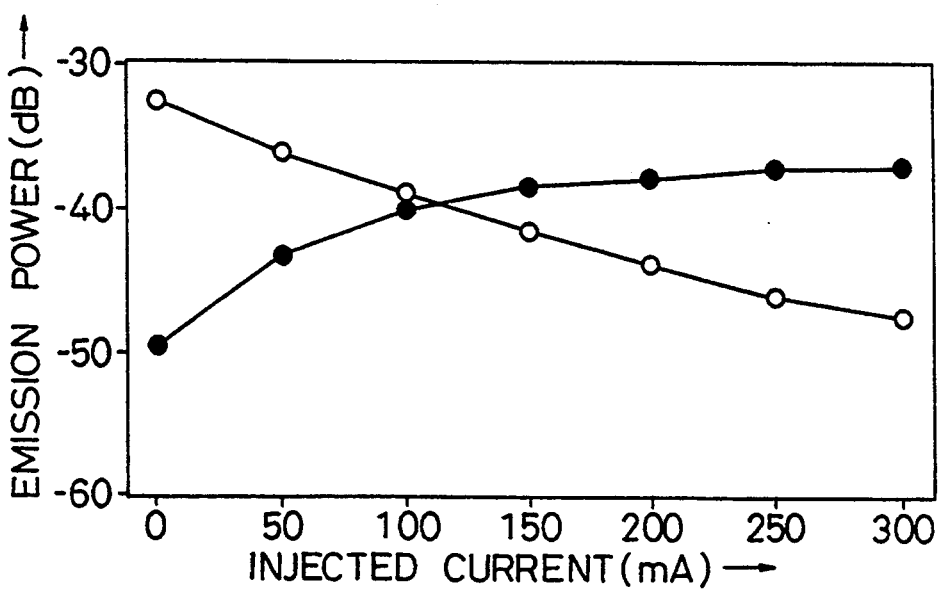
FIG. 10 is a graph showing the switching characteristics of a modification of the optical switch of FIG. 8.

FIG. 10 shows the switching characteristics of this optical waveguide switch for the light of 1.55 μm wavelength.

in FIG. 10, a circle represents the emission power from the emission-side optical waveguide 2b obtained when the light is applied from the incidence-side optical waveguide 2a, and a black spot represents the emission power from the emission-side optical waveguide 1b.

As seen from FIG. 10, this optical switch starts the switching operation at about 110 mA, and its initial crosstalk level is 17.6 dB.

Further, the operating crosstalk level of this optical switch is 10.6 dB.

In the case of an optical switch with the construction of Embodiment 5, the intersection angle θ at 6°, and its refractive index changing region shaped as shown in FIG. 1, its initial and operating crosstalk levels were 17.3 dB and 8.1 dB, respectively.

Embodiment 6

An optical waveguide switch was manufactured in the same manner as Embodiment 2 except that each lateral portion the plane configuration of the crossing section 3 was defined by the circumference of a circular are with the curvature radius of 5 mm, and that the intersection angle θ was 4°. The initial crosstalk level of this optical switch was 17.2 dB.

What is claimed is:

1. A total internal reflection-type optical waveguide switch, made of semiconductor material, the optical waveguide switch comprising:

a pair of semiconductor optical waveguides crossing each other so that a refractive index changing region for reflecting light is formed at a crossing section between the waveguides of said pair of optical waveguides;

said pair of optical waveguides and said refractive index changing region all being made of laminated layers of a semiconductor material, respectively;

an electrode on said refractive index changing region for applying electrical energy to said refractive index changing region; and said refractive index changing region having a smoothly curved concave reflective surface recessed with respect to a lateral portion of said crossing section.

2. A total internal reflection-type optical waveguide switch according to claim 1, wherein said concave portion is a curved surface defined by an arc of a circle.

3. A total internal reflection-type optical waveguide switch according to claim 1, wherein the intersection angle between said optical waveguides ranges from 4° to 6°, and the curve defining said concave portion is a circular arc having a curvature radius of 5 mm.

4. A total internal reflection-type optical waveguide switch according to claim 1, wherein said refractive index changing region is activated by current injection from said electrode on said refractive index changing region.

5. A total internal reflection-type optical waveguide switch according to claim 1, wherein said concave portion is a curved surface defined by an arc of an ellipse.

6. A total internal reflection-type optical waveguide switch according to claim 1, wherein said refractive index changing region is activated by voltage application from said electrode on said refractive index changing region.

7. A total internal reflection-type optical waveguide switch according to claim 1, wherein:
said refractive index changing region contains a larger amount of impurity than the remaining region, the impurity contained in said refractive index changing region reaching a core layer of the optical waveguide switch; and
a refractive index change being generated in the core layer by means of current injection from said electrode on said refractive index changing region.

8. A total internal reflection-type optical waveguide switch according to claim 7, wherein said refractive index changing region is formed by diffusing an impurity to a depth reaching the core layer.

9. A total internal reflection-type optical waveguide switch according to claim 8, wherein said impurity comprises Zn.

10. A total internal reflection-type optical waveguide switch according to claim 7, wherein said concave portion is a curved surface defined by an arc of a circle.

11. A total internal reflection-type optical waveguide switch according to claim 7, wherein said concave portion is a curved surface defined by an arc of an ellipse.

12. A total internal reflection-type optical waveguide switch according to claim 7, wherein the intersection angle between said optical waveguides ranges from 4° to 6°, and the curve defining said concave portion is a circular arc having a curvature radius of 5 mm.

13. A total internal reflection-type optical waveguide switch according to claim 1, wherein:
said refractive index changing region contains a larger amount of impurity than the remaining region, the impurity contained in said refractive index changing region reaching a core layer of the optical waveguide switch; and
a refractive index change being generated in the core layer by means of voltage application from said electrode on said refractive index changing region.

14. A total internal reflection-type optical waveguide switch according to claim 13, wherein said refractive index changing region is formed by diffusing an impurity to a depth reaching the core layer.

15. A total internal reflection-type optical waveguide switch according to claim 14, wherein said impurity comprises Zn.

16. A total internal reflection-type optical waveguide switch according to claim 13, wherein said concave portion is a curved surface defined by an arc of a circle.

17. A total internal reflection-type optical waveguide switch according to claim 13, wherein said concave portion is a curved surface defined by an arc of an ellipse.

18. A total internal reflection-type optical waveguide switch according to claim 13, wherein the intersection angle between said optical waveguides ranges from 4° to 6°, and the curve defining said concave portion is a circular arc having a curvature radius of 5 mm.

19. A total internal reflection-type optical waveguide switch according to claim 1, wherein:
said refractive index changing region contains a larger amount of impurity than the remaining region, the impurity contained in said refractive index changing region reaching the vicinity of a core layer of the optical waveguide switch; and
a refractive index change being generated in the vicinity of the core layer by means of current injection from said electrode on said refractive index changing region.

20. A total internal reflection-type optical waveguide switch according to claim 19, wherein said refractive index changing region is formed by diffusing an impurity to a depth reaching the vicinity of the core layer.

21. A total internal reflection-type optical waveguide switch according to claim 20, wherein said impurity comprises Zn.

22. A total internal reflection-type optical waveguide switch according to claim 19, wherein said concave portion is a curved surface defined by an arc of a circle.

23. A total internal reflection-type optical waveguide switch according to claim 19, wherein said concave portion is a curved surface defined by an arc of an ellipse.

24. A total internal reflection-type optical waveguide switch according to claim 19, wherein the intersection angle between said optical waveguides ranges from 4° to 6°, and the curve defining said concave portion is a circular arc having a curvature radius of 5 mm.

25. A total internal reflection-type optical waveguide switch according to claim 1, wherein:
said refractive index changing region contains a larger amount of impurity than the remaining region, the impurity contained in said refractive index changing region reaching the vicinity of a core layer of the optical waveguide switch; and
a refractive index change being generated in the vicinity of the core layer by means of voltage application from said electrode on said refractive index changing region.

26. A total internal reflection-type optical waveguide switch according to claim 25, wherein said refractive index changing region is formed by diffusing an impurity to a depth reaching the vicinity of the core layer.

27. A total internal reflection-type optical waveguide switch according to claim 26, wherein said impurity comprises Zn.

28. A total internal reflection-type optical waveguide switch according to claim 25, wherein said concave portion is a curved surface defined by an arc of a circle.

29. A total internal reflection-type optical waveguide switch according to claim 25, wherein said concave portion is a curved surface defined by an arc of an ellipse.

30. A total internal reflection-type optical waveguide switch according to claim 25, wherein the intersection angle between said optical waveguides ranges from 4° to 6°, and the curve defining said concave portion is a circular arc having a curvature radius of 5 mm.

* * * * *